J. J. RAWLINGS.
METHOD FOR THE MANUFACTURE OF TUBULAR WALL PLUGS FROM STRING OR LIKE MATERIAL.
APPLICATION FILED JUNE 19, 1920.
1,421,306.
Patented June 27, 1922.
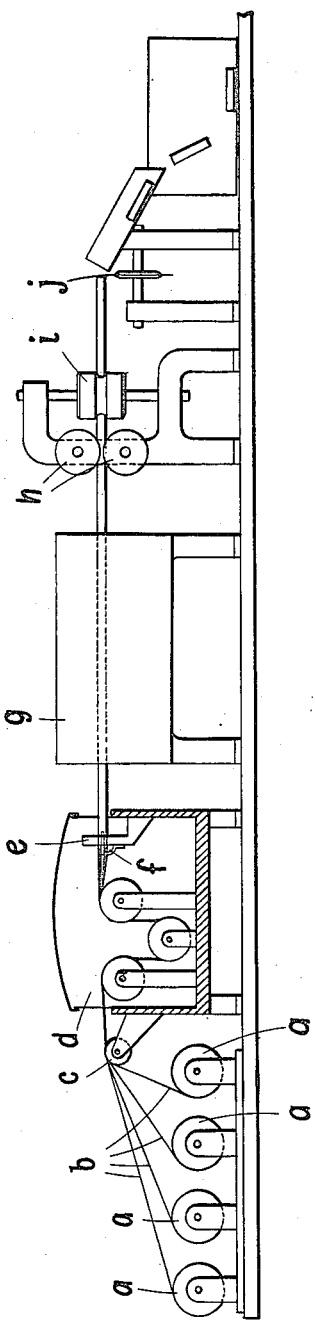

UNITED STATES PATENT OFFICE.

JOHN JOSEPH RAWLINGS, OF SOUTH KENSINGTON, LONDON, ENGLAND, ASSIGNOR OF ONE-HALF TO THE RAWLPLUG COMPANY LIMITED, OF SOUTH KENSINGTON, LONDON, ENGLAND, A CORPORATION OF GREAT BRITAIN.

METHOD FOR THE MANUFACTURE OF TUBULAR WALL PLUGS FROM STRING OR LIKE MATERIAL.

1,421,306.          Specification of Letters Patent.     Patented June 27, 1922.

Application filed June 19, 1920. Serial No. 390,232.

*To all whom it may concern:*

Be it known that I, JOHN JOSEPH RAWLINGS, a subject of the King of Great Britain, residing at 95 Gloucester Road, South Kensington, London, England, have invented a new and useful Improved Method for the Manufacture of Tubular Wall Plugs From String or like Material, of which the following is a specification.

This invention relates to an improved method and plant for the manufacture of tubular wall plugs from string or like material.

Such wall plugs are useful for enabling screws, nails and other fastening means to be secured in plaster, marble and other materials, and are formed of threads, twines or cords of suitable fibres grouped side by side and held together by an adhesive.

According to this invention a number of cops or spools are arranged on a creel or the like to deliver separate twines to a gathering roller from which roller said twines pass together as a bundle into a tank containing glue or other adhesive by which the twines are coated. Before emerging from this tank the bundle of twines passes through an aperture in a die plate which shapes them and squeezes or strips off any superfluous adhesive. In combination with the die plate there is provided a mandril extending into the aperture in the die plate and operating in a known manner to form a longitudinal channel in the rod or bundle of twines.

The glued twines issuing from the die plate in a continuous tubular bundle next pass through a drying oven in which the glue becomes set and more or less hardened.

The continuous tubular bundle after being thus dried passes successively between pairs of power driven rollers suitably arranged in a similar manner to wire drawing rollers with peripheral grooves of appropriate contour to shape and compress the tubular bundle as required, and to draw the twines from the cops or spools through the adhesive tank, die plate and oven.

Finally the tubular bundle as it leaves the power driven rollers is cut into suitable lengths to form wall plugs preferably by a rotary cutting device of the kind in which the cutter moves axially with the material on which it is operating simultaneously with its transverse cutting movement and after severing one piece is moved clear of the material and returned to its original position to commence a fresh cut.

A suitable arrangement of plant for carrying out the manufacture of wall plugs as hereinabove described, is shown diagrammatically in the accompanying drawing in which $a$, $a$ are spools by which separate twines $b$ are delivered to a roller $c$ by which they are gathered together and guided to a tank $d$ containing an adhesive in which the twines are immersed. A die plate $e$ and mandril $f$ are arranged within the tank $d$ or in one of the walls thereof so that superfluous adhesive removed from the coated twines drips back into the tank. The mandril $f$ acts in the manner well known in tube forming extrusion apparatus to form a longitudinal channel within the bundle of twines. Next to the tank there is provided a drying oven $g$ through which the twines in tubular formation are conducted after they have passed through the die plate. Movement is imparted to the twines by rollers $h$, $h$, and $i$, $i$ arranged in pairs like wire drawing rollers, the respective axes of the pairs of rollers being arranged transversely one to the other and to the direction of movement of the tubular bundle. These rollers $h$ and $i$ also serve to compress the tubular bundle which is afterwards subjected to the action of a cutting tool $j$, by which it is divided into suitable lengths for use as wall plugs. The cutting tool may be of any convenient type but as indicated by the diagram a rotary cutting tool is preferred.

I claim:—

1. A method of manufacturing tubular wall plugs, consisting in gathering together a plurality of separate strands of fibrous material, arranging these strands in a bundle side by side in substantially parallel relation, coating the strands with an adhesive, opening the bundle of strands to a tubular form, stripping off superfluous adhesive, drying the adhesive coating, compressing and shaping the exterior of the tubular bundle, and dividing the said bundle into separate plugs.

2. A method of manufacturing tubular wall plugs, consisting in gathering together a plurality of separate strands of fibrous material, arranging these strands in a bundle side by side in substantially parallel relation, coating the strands with an adhesive by immersion, opening the bundle of strands to a tubular form by means of a mandrel, removing superfluous adhesive by means of a die plate, drying the adhesive coating, compressing and shaping the exterior of the tubular bundle by passing it between rollers, and dividing the bundle transversely into lengths forming separate plugs.

JOHN JOSEPH RAWLINGS.

Witnesses:
LESLIE TWERDIE SMITH,
JOHN KIRKHAM.